UNITED STATES PATENT OFFICE.

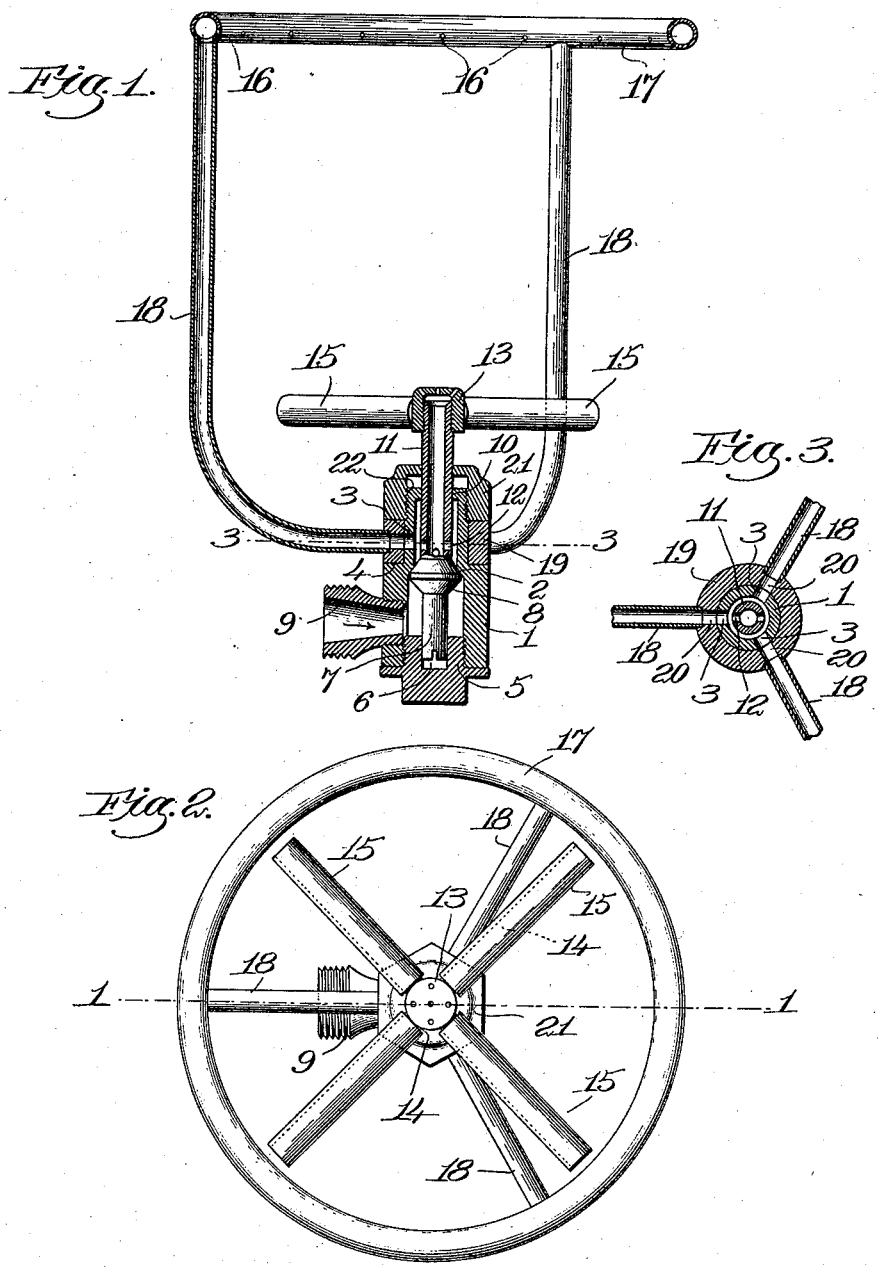

THEODORE G. STRATER, JR., OF WEST TISBURY, MASSACHUSETTS, ASSIGNOR TO HERMAN STRATER & SONS, OF BOSTON, MASSACHUSETTS, A FIRM.

TUMBLER-WASHER.

1,072,528.   Specification of Letters Patent.   Patented Sept. 9, 1913.

Application filed July 1, 1912. Serial No. 706,888.

*To all whom it may concern:*

Be it known that I, THEODORE G. STRATER, Jr., a citizen of the United States, and resident of West Tisbury, county of Dukes, State of Massachusetts, have invented an Improvement in Tumbler-Washers, of which the following description, in connection with the accompanying drawing, is a specification, like characters on the drawing representing like parts.

This invention has for its object the production of a novel, simple and convenient apparatus for washing tumblers, the apparatus being of the type wherein the depression of the tumbler opens the valve controlling the flow of wash water from a suitable source of supply. Inasmuch as such tumbler washers are generally used where the public water supply is under considerable pressure I have provided simple and efficient means for regulating the flow of water to the device for washing the exterior of the tumbler, so that the water will not be discharged by said device with sufficient force to splash or spatter surrounding objects.

The various novel features of my invention will be fully described in the subjoined specification and particularly pointed out in the following claims.

Figure 1 is a front elevation and section, on the line 1—1, Fig. 2, of a tumbler washer embodying my present invention, the parts being shown in normal position, with the main valve closed; Fig. 2 is a top plan view of the tumbler washer; Fig. 3 is a horizontal sectional detail on the line 3—3, Fig. 1, of the auxiliary valve device, to be described.

Referring to the drawing, 1 is a tubular valve casing, having a valve seat 2 therein and a plurality of equi-distant lateral outlets 3 in its side wall above said seat, the casing being externally reduced in diameter to leave an annular shoulder 4 below the outlets, three of which are shown in Fig. 3. The lower end of the casing is closed by a screw plug 5, having a central socket 6 which forms a guide for the depending extension 7 of the main valve 8, Fig. 1, said valve being seated normally by the pressure of the water from the source of supply, and the casing 1 is adapted to be connected with the water supply by an inlet nipple 9 which opens into the casing below the valve seat. The upper end of the casing is centrally apertured at 10, Fig. 1, to receive the longitudinally movable, tubular valve stem 11, having apertures 12 adjacent the valve, the upper end of said stem being threaded for the reception of a perforated nozzle 13. Said nozzle is herein shown as provided with several radial and preferably horizontal arms 14 which constitute a tumbler rest, the tumbler to be washed being seated on the arms mouth downward, in well known manner. To obviate any danger of breakage I prefer to cover the arms 14 with a cushioning material, and this is conveniently effected by forcing rubber tubing 15 onto each arm.

When a tumbler is placed upon the rest and is pushed downward the stem 11 is moved downward in the casing 1, unseating the valve 8 and permitting water to flow through the casing and into the stem by means of the holes 12, the water being sprayed upon the interior of the tumbler through the perforated nozzle 13. With ordinary pressures of water the valve 8 will be re-seated automatically as soon as the downward pressure upon the tumbler rest is removed, but should such water pressure be insufficient a valve closing spring may be inserted in the casing between the valve and the plug 5, such spring closed valves being well known in the art.

The exterior of the tumbler is washed by water discharged in small streams or sprays through apertures 16, Fig. 1, in an annular pipe 17 located above the tumbler rest and concentric therewith, said pipe being sustained by a series of upturned tubular supports 18 opening at their upper ends into the pipe. I have herein shown three of these supports, the lower ends thereof being inturned and fixedly secured to a collar 19 revolubly mounted upon and snugly fitting the reduced portion of the valve casing 1, and seating upon the annular shoulder 4 thereof. This collar has three radial apertures or ports 20, Fig. 3, which communicate at all times with the adjacent ends of the supports 18, and these apertures 20 are adapted to register with the lateral outlets 3 of the valve casing, as clearly shown in Fig. 3. By effecting angular movement of the collar 19 it will be manifest that the effective area of the said outlets 3 will be varied, from maximum shown in Fig. 3 to zero, so that the supply of water admitted to the tubular supports 18 and the connected pipe 17 can be regulated to any desired degree by the angular adjustment of the collar 19, which is an auxiliary valve. This adjustment enables me to reduce the flow of water for washing the exterior of the tumbler to such an extent that spattering will be obviated, irrespective of the pressure of the main water supply, as will be apparent.

To retain the auxiliary valve in adjusted position I provide an internally threaded, hollow cap 21, which screws onto the threaded upper end 22 of the valve casing and bears upon the valve or collar 19, clamping it securely in angularly adjusted position upon the shoulder 4. The cap is centrally apertured for the reception of the tubular valve stem 11, as shown clearly in Fig. 1. When the auxiliary valve has been adjusted in accordance with the water pressure of the source of supply the cap 21 is set up tightly and the pipe 17 is thereby held securely and fixedly upon the valve casing.

The apparatus is simple and efficient, it is easy to regulate, and its construction is inexpensive. By regulating equally the flow of water to each of the tubular supports 18 the discharge from all parts of the perforated pipe 17 is uniform.

Having fully described my invention, what I claim as new and desire to secure by Letters Patent is:

1. In a tumbler washer, a valve casing adapted to be connected with a water supply and provided with a plurality of lateral outlets, a valve in and to control the entrance of water to the casing, a tumbler rest and an attached nozzle to deliver water to the interior of a tumbler on the rest, a collar revoluble on the casing and apertured to register with the lateral outlets thereof, a perforated pipe located above the tumbler rest, to discharge water on the exterior of a tumbler thereon, upturned tubular supports connected with said pipe and collar and communicating with the apertures of the latter, to supply water to the pipe when the valve is opened, angular adjustment of the collar varying the effective area of the outlets of said casing, and means to retain the collar in angularly adjusted position.

2. In a tumbler washer, a valve casing adapted to be connected with a water supply and having therein a valve seat and a plurality of lateral outlets above the seat, a valve vertically movable in the casing and having an attached apertured nozzle extended through the top of the casing, a tumbler rest mounted on the nozzle above the casing, a perforated pipe located above the tumbler rest to discharge water on the exterior of a tumbler thereon, tubular supports fixedly attached to the pipe and at their lower ends revolubly connected with the casing adjacent and communicating with the lateral outlets thereof, and means to retain said supports in fixed position on the casing, bodily rotative movement of the supports relative to the casing varying the effective area of the outlets thereof to thereby regulate the supply of water passing through the outlets to the tubular supports when the valve is opened.

3. In a tumbler washer, a nozzle and a tumbler rest, a valve casing adapted to be connected with a supply of water and having a valve therein to control the passage of water to the nozzle, means to discharge water upon the exterior of a tumbler seated on the rest, said means including a series of tubular supports communicating with the interior of the casing, and means between the valve casing and tubular supports to vary simultaneously and equally the flow of water from the valve casing to the several tubular supports.

4. In a tumbler washer, a tumbler rest, separate means to discharge water upon the interior and exterior of a tumbler seated upon the rest, a valve-casing having lateral outlets, a main valve in the casing, opened by movement of the tumbler rest to abnormal position, to permit the passage of water to both of said means, and an auxiliary valve revolubly mounted on the casing around said lateral outlets and communicating with the means for discharging water upon the exterior of a tumbler, angular adjustment of said auxiliary valve varying the effective area of the said outlets.

5. In a tumbler washer, a nozzle and an attached tumbler rest, a valve casing having a valve seat therein and lateral outlets above it, an external annular shoulder on the casing below the outlets, a valve having an apertured stem slidable in the top of the casing and carrying the nozzle, said valve regulating the supply of water from the casing to said nozzle and outlets, a collar revolubly mounted on the casing and seated on the shoulder thereof, said collar having apertures adapted to register with the lateral outlets, means communicating with the apertures to discharge water upon the exterior of a tumbler on the rest, and a nut to engage the collar and clamp it in angularly adjusted position on the casing, such adjustment of the collar varying the effective area of the casing outlets.

6. A tumbler washer comprising a valve casing having a port, a nozzle connected with the valve casing for directing fluid to the inside of the tumbler, and a distributer for directing fluid to the outside of the tumbler comprising a member having a port registering with the valve casing port, the said member being adjustable to vary the degree of registration of said ports whereby the amount of fluid passing to the distributer may be varied.

7. A tumbler washer comprising a valve casing having a lateral port, a nozzle connected with the valve casing for directing fluid to the inside of the tumbler, a distributer for directing fluid to the outside of the tumbler comprising a sleeve provided with a port and adjustable to vary the degree of registration with a port of the valve casing, whereby the amount of fluid passing through the distributer may be varied, and means to control the admission of fluid to the valve casing.

8. A tumbler washer comprising a valve casing having a port, a nozzle connected with the valve casing for directing fluid to the inside of the tumbler, a tubular frame for directing fluid to the outside of the tumbler comprising a sleeve mounted on the valve casing provided with a port and adjustable to vary the degree of registration of said port with the port of the valve casing whereby the proportion of fluid passing through the frame may be varied and a screw cap on the valve casing adapted to clamp the sleeve in adjusted position.

9. A tumbler washer comprising a valve casing having a lateral port, a nozzle connected with the valve casing for directing fluid to the inside of the tumbler, and a tubular frame for directing fluid to the outside of the tumbler comprising a sleeve mounted on the valve casing provided with a fluid inlet and adjustable to vary the degree of registration of the inlet with the lateral port of the valve casing whereby the proportion of fluid passing through the frame may be varied.

In testimony whereof, I have signed my name to this specification, in the presence of two subscribing witnesses.

THEODORE G. STRATER, Jr.

Witnesses:
 JOHN C. EDWARDS,
 FREDERICK S. GREENLEAF.

Copies of this patent may be obtained for five cents each, by addressing the "Commissioner of Patents, Washington, D. C."